United States Patent Office 3,004,048
Patented Oct. 10, 1961

3,004,048
METHOD FOR PREVENTING COLOR REVERSION OF FATTY MATERIAL
John W. Copenhaver, Short Hills, Jack Kwiatek, North Arlington, and Horace R. Davis, Jr., Nutley, N.J., assignors to The M. W. Kellogg Company, Jersey City, N.J., a corporation of Delaware
No Drawing. Filed Apr. 4, 1951, Ser. No. 219,318
9 Claims. (Cl. 260—398.5)

This invention relates generally to the preservation of light color in organic fats, oils, and fatty acids by the addition of relatively small quantities of mercaptans, or even better in the case of some materials, a mercaptan plus as synergistic agent such as certain weak non-oxidizing acids or formaldehyde.

One of the important applications of the method is the preservation of light color in tallow which has been decolorized by solvent fractionation with hot propane. Such tallow is near white or light yellow immediately after decolorizing but degenerates within a few days or a few weeks, depending upon temperature, to a darker yellow or even a brown; according to the present invention, this darkening is retarded or prevented by the addition of between 0.01 and 5% of a mercaptan or of between 0.005% and 2% of a mercaptan plus between 0.005 and 0.2% of a synergist such as phosphoric acid or oxalic acid.

In this specification, the term "fatty materials" is used to refer to animal, vegetable and marine fats and oils, and materials, such as fatty acids, which are derived directly therefrom. For example, the process has been employed in both whale and menhaden oil; any vegetable oil, cotton seed oil and cotton seed fatty acid foots have been preserved in color; among animal fats, tallow and tallow fatty acids are referred to herein as tallow fatty materials.

The principal color preserving material employed is a mercaptan, almost every mercaptan known having been found effective to a fairly satisfactory degree. Some were better than others; 2-mercaptoethanol was preferred for tallow. The term "a mercaptan material" is used to include all the known mercaptan substances possessing one or more free sulfhydryl groups. A group may be made up of 2-mercaptoethanol, thiophenyl, benzyl mercaptan and their homologs. The synergistic agents used were orthophosphoric acid, oxalic acid, formaldehyde, formic acid, and citric acid in about that order of desirability for prevention of color reversion in tallow. This order may vary with other fatty materials. Orthophosphoric acid is found to be the most generally satisfactory. It should be noted that substances that are hydrolyzed by the moisture present in fatty material, such as phosphoric anhydride, pyrophosphoric acid, metaphosphoric acid, polyphosphoric acids, etc., may be substituted for orthophosphoric acid.

The applicants have referred to the acid, or formaldehyde, as a synergistic agent because it appears to function after the manner of a synergist. Considerably less mercaptan is more effective in the presence of the synergistic agent, the latter seeming to remain relatively unchanged, than without it. Presumably the mercaptans act as inhibitors for the chain propagated autooxidation of the fatty materials. In the autooxidation reaction of fats, oxygen is believed to attack the fatty materials at methylene groups adjacent to the points of unsaturation thus forming various hydroperoxides. These hydroperoxides decompose in such ways as to propagate the chain of further oxidation and at the same time give rise to color bodies as well as other degradation products. Mercaptans prevent the propagation of these chain reactions. This seems to be assisted by the so-called synergist, but applicants' invention is not to be limited in any way by this hypothesis or its correctness.

It is to be emphasized that the object of the applicants' invention is not to prevent oxidation or to preserve taste or odor. As a matter of fact, the mercaptans usually have a bad odor. Also, excellent antioxidants are available for preserving fatty materials, but they do not, at the same time, preserve color; the product of their oxygen-eliminating reaction is often a colored material.

Applicants' object is to prevent change in color, even if oxidation products are formed. The mercaptans effectively do this. It is not the inhibition of all oxidation, rancidity, or chemical changes, but only the preservation of color that is sought.

One of the most useful applications of the present invention is in the manufacture of white or other light colored soaps in which it is necessary that the soap stock fat be free of any dark colored material. Tallow, as first obtained from rendering processes, is in a rather dirty condition, containing small amounts of blood, tissues, degradation products and dark color bodies. Various methods of decolorizing tallow by passing it through clay beds, treating with chemical bleaching agents and solvent extraction had been proposed. Regardless of the method used, the decolorized products have a tendency to darken gradually. This is extremely inconvenient because it means that the decolorized tallow must be taken directly to the soap manufacturer and can not be stored for any length of time or shipped from a decolorizing plant to a distant soap factory, because of the darkening of color which occurs in the interim. This has been found particularly inconvenient when the tallow is decolorized by solvent extraction with hot propane, as described in application Serial No. 136,304 of Passino and Morfit now Pat. No. 2,621,198. In that process the tallow is contacted with propane (or other normally gaseous or low-boiling solvent having a critical temperature of 450° F. or less) at temperatures in a range of temperatures near the critical temperature of the solvent in which miscibility of the tallow with the solvent decreases gradually as the temperature increases and the critical temperature of the solvent is approached. Almost any desired portion of the tallow can be precipitated into a lower raffinate by a proper selection of the temperature in this range and proper control of conditions to see that the process reaches an equilibrium. In decolorizing a small fraction within a range of .5% to 7%, usually about 2%, is precipitated into a lower raffinate phase. This lower raffinate phase includes substantially all the color bodies; the upper extract phase containing substantially all of the tallow, is decolorized. However, the process is most efficiently carried out in a very large solvent extraction plant and it may be desirable that the decolorized tallow product be used in several soap factories, some of which may be at a considerable distance. Also, it is desirable to be able to store for a reasonable period of time, say between 1 week and 6 months, substantial amounts of decolorized tallow. Heretofore, however, the color of the tallow could not be preserved. Instead, it grew slightly darker as weeks passed, particularly in the summer or if stored with exposure to air and sunlight. Also, the darkening was accelerated by melting and remelting the tallow to transfer it from one storage tank to another or from a storage tank to a tank car and from the car to a soap plant receiving location. Moreover, decolorizing the tallow tends to remove some of the natural preservatives in the raw tallow so that the decolorized product is even more susceptible to color degeneration than the raw tallow. For example, the solvent fractionation system precipitates an important part of the natural preservatives into the small amount of raffinate with which the coloring matter is removed.

It is a major object of the present invention to provide a method for preserving the color of decolorized tallow product and to prevent the light colored tallow from darkening under storage and melting and remelting conditions for a much longer time than is the case with unprotected decolorized tallow products. The problem is not the same as preventing oxidation of the tallow or preventing rancidity or preventing chemical changes. As a matter of fact, any chemical change in the various components of the tallow which will prevent the tallow from darkening without interfering with its value in its intended use is perfectly acceptable.

EXAMPLES

A suitable quantity of hot-propane-decolorized tallow or other fatty material was treated with varying weight percentages of mercaptans as shown in column 2, Table I and III or of mercaptans plus a synergistic agent as shown in Table II or IV. The temperature of the mixture was raised to, and held at, 150° F. for periods up to 28 days. At regular intervals, their color was compared with F.A.C. color standards.

The data presented in Table I below illustrate the effectiveness of mercaptans alone in inhibiting color reversion in decolorized tallow. The tallow, which had been decolorized by extraction with hot propane to an F.A.C., (Fat Analysis Committee of American Oil Chemist's Society), color of 5 (very light yellow) reverts rapidly at 150° F. when in nominal contact with the atmosphere; and even more rapidly at 235° F. F.A.C. colors shown in the tables below are all consistent within themselves, i.e. a high number indicates a darker color than any other lower number within the series.

TABLE I

*Color reversion of tallow in the presence of mercaptans*

| Mercaptan | Weight percent conc. | FAC color after days aging at 150° F. | | | | | |
|---|---|---|---|---|---|---|---|
| | | 0 | 1 | 4 | 7 | 14 | 21 | 28 |
| Blank | | 5 | 7 | 13 | 15 | 17 | 19 | 21 |
| 2-mercaptoethanol | 1.0 | 5 | 5 | 5 | 5 | 5 | 5 | 5 |
| Do | .5 | 5 | 5 | 5 | 5 | 5 | 5 | 5 |
| Do | .1 | 5 | 7 | 13 | 15 | 15 | 17 | 17 |
| Do | .05 | 5 | 7 | 11 | 13 | 15 | 15 | 15 |
| Do | .01 | 5 | 7 | 13 | 15 | 17 | 17 | 17 |
| Thiophenol | 1.0 | 5 | 5 | 5 | 5 | 5 | 5 | 5 |
| Do | .5 | 5 | 5 | 5 | 5 | 5 | 5 | 5 |
| Do | .1 | 5 | 5 | 7 | 9 | 11 | 13 | 13 |
| Do | .05 | 5 | 7 | 11 | 11 | 11 | 13 | 13 |
| Benzyl mercaptan | 1.0 | 5 | 5 | 5 | 5 | 5 | 5 | 5 |
| Do | .5 | 5 | 5 | 5 | 7 | 11 | 13 | 15 |
| Do | .1 | 5 | 7 | 11 | 11 | 13 | 13 | 13 |
| Do | .05 | 5 | 7 | 11 | 11 | 13 | 13 | 15 |
| Thioglycollic acid | 1.0 | 5 | 5 | 5 | 5 | | | |
| Do | .5 | 5 | 5 | 5 | 11 | | | |
| Do | .1 | 5 | 9 | 11 | 13 | | | |
| Do | .05 | 5 | 9 | 11 | 15 | | | |
| n-Butyl mercaptan | 1.0 | 5 | 5 | 7 | 7 | 7 | 9 | 9 |
| Do | .5 | 5 | 5 | 7 | 7 | 7 | 9 | 9 |
| Cyclohexyl mercaptan | 0.5 | 5 | 5 | 7 | 7 | 9 | 9 | 9 |
| t-Dodecyl mercaptan | 1.0 | 5 | 7 | 11 | 13 | 13 | 15 | 15 |
| Do | .5 | 5 | 7 | 11 | 13 | 13 | 15 | 15 |
| t-Butyl mercaptan | 1.0 | 5 | 5 | 9 | 11 | 13 | 13 | 15 |
| Do | .5 | 5 | 5 | 9 | 11 | 13 | 13 | 13 |
| t-Octyl mercaptan | 1.0 | 5 | 7 | 9 | 11 | 13 | 13 | 13 |
| Aminobenzenethiol | 1.0 | 7 | 11 | 11 | 11 | 11 | | |

The order of preference of mercaptans for the purpose of this invention is the same as the order in which they are listed in Table I, i.e., 2-mercaptoethanol is preferred above others listed below it for tallow.

In Table II below, data is given showing the effect of mercaptans plus a synergistic agent. It is to be noted that, as explained elsewhere in this invention, the addition of the synergistic agent permits a marked reduction in the amount of mercaptan which must be added to protect the decolorized fat against color reversion.

TABLE II

*Color reversion of tallow in presence of mercaptans with synergists*

| Mercaptan percent | Synergist acid | Percent | FAC color after days aging at 150° F. | | | | | |
|---|---|---|---|---|---|---|---|---|
| | | | 0 | 1 | 4 | 7 | 14 | 21 | 28 |
| Blank | Blank | | 5 | 5 | 13 | 15 | 17 | 19 | 21 |
| 2-mercaptoethanol: | | | | | | | | | |
| .1 | Phosphoric | .1 | 5 | 5 | 5 | 5 | 7 | 9 | 9 |
| .05 | do | .05 | 5 | 5 | 5 | 7 | 9 | 9 | 9 |
| .1 | Oxalic | .1 | 5 | 5 | 7 | 9 | 11 | 11 | 13 |
| .05 | do | .05 | 5 | 5 | 5 | 7 | 9 | 11 | 13 |
| Thiophenol: | | | | | | | | | |
| .1 | Phosphoric | .1 | 5 | 5 | 7 | 9 | 11 | 13 | 13 |
| .05 | do | .05 | 5 | 5 | 5 | 5 | 7 | 9 | 11 |
| .1 | Oxalic | .1 | 5 | 5 | 5 | 7 | 9 | 11 | 13 |
| .05 | do | .05 | 5 | 5 | 5 | 5 | 7 | 9 | 11 |
| Benzyl mercaptan: | | | | | | | | | |
| .1 | Phosphoric | .1 | 5 | 5 | 5 | 7 | 7 | 9 | 9 |
| .05 | do | .05 | 5 | 5 | 5 | 5 | 7 | 7 | 9 |
| .1 | Oxalic | .1 | 5 | 5 | 5 | 7 | 7 | 9 | 11 |
| .05 | do | .05 | 5 | 5 | 5 | 7 | 9 | 11 | 11 |

Phosphoric acid is the preferred synergist to be used with the preferred mercaptans for tallow. The mercaptans may impart an objectionable odor which interferes with the odor and taste tests for edible products. However, in the preparation of soap from tallow treated according to this invention substantially all of the anti-color-reversion agents added to the decolorized tallow will be washed out with alkali materials in the later steps of the soap-making process.

In Table III, below, data is given to show the effect of mercaptans for the prevention of color reversion in fatty materials other than tallow.

TABLE III

Tallow Fatty Acids

| Mercaptan | F.A.C. Color After Days Aging at 150° F. | | | |
|---|---|---|---|---|
| | 0 | 7 | 14 | 28 |
| Blank | 7 | 13 | 15 | 17 |
| 0.5% benzyl mercaptan | 7 | 7 | 9 | 11 |
| 0.5% thiophenol | 7 | 7 | 9 | 11 |
| 0.5% 2-mercaptoethanol | 7 | 7 | 9 | 13 |

Menhaden Oil, High I₂ Value

| | 0 | 7 | 14 | 28 |
|---|---|---|---|---|
| Blank | 1 | 3 | 3 | 5 |
| 0.5% benzyl mercaptan | 1 | 1 | 1 | 3 |
| 0.5% thiophenol | 1 | 3 | 3 | 3 |
| 0.5% 2-mercaptoethanol | 1 | 1 | 1 | 3 |

Menhaden Oil, Regular

| | 0 | 7 | 14 | 28 |
|---|---|---|---|---|
| Blank | 1 | 1 | 3 | 5 |
| 0.5% benzyl mercaptan | 1 | 1 | 3 | 3 |
| 0.5% thiophenol | 1 | 1 | 1 | 1 |

Whale Oil Fatty Acids

| | 0 | 7 | 14 | 28 |
|---|---|---|---|---|
| Blank | 9 | 19 | 21 | |
| 0.5% benzyl mercaptan | 9 | 15 | 19 | |
| 0.5% thiophenol | 9 | 15 | 19 | |

Table IV gives data to illustrate the effectiveness of synergists with certain of the fatty materials shown in Table III above.

TABLE IV

Menhaden Oil, High I₂ Value

| Mercaptan | Synergists | F.A.C. color after days aging at 150° F. | | | |
|---|---|---|---|---|---|
| | | 0 | 7 | 14 | 28 |
| Blank | | 1 | 3 | 3 | 5 |
| 0.1% benzyl mercaptan | 0.5% oxalic acid | 1 | 3 | 3 | 3 |
| 0.1% thiophenol | do | 1 | 1 | 3 | 3 |
| 0.1% 2-mercaptoethanol | do | 1 | 1 | 3 | 3 |

Menhaden Oil, Regular

| | | | | | |
|---|---|---|---|---|---|
| Blank | | 1 | 1 | 3 | 5 |
| 0.1% benzyl mercaptan | 0.5% oxalic acid | 1 | 1 | 1 | 3 |
| 0.1% thiophenol | do | 1 | 1 | 1 | 5 |
| 0.1% 2-mercaptoethanol | do | 1 | 3 | 3 | 3 |

It was found that phosphoric acid was deleterious when used as a synergist in the prevention of color reversion in menhaden oil, either the high-iodine-value or regular types, or in whale oil. Furthermore, it was found that phosphoric acid and oxalic acid were ineffective as synergists for the mercaptans in the treatment of tallow fatty acids or whale oil; i.e., the mercaptans alone were as effective in preventing color reversion as additions of mercaptans plus the synergistic agent.

The scope of this invention is not to be limited to the examples given in Tables I through IV. It will be found that normal- and branched chain mercaptans in the range $C_2$ to $C_{12}$, mercapto alcohols in the range $C_2$ to $C_6$, alicyclic mercaptans in the range $C_3$ to $C_{12}$, thiophenol, thiocresols, thioxylenols, and benzyl mercaptan and its homologs having one or more alkyl groups substituted in the aromatic nucleus, will all exhibit some anti-color-reversion activity when employed within the broad limits of this invention, with or without the addition of a synergistic agent. Tert.-aliphatic mercaptans must be employed in quantities of about 1% without a synergist, in order in exhibit anti-color-reversion activity.

It is intended that the scope of this invention shall not be limited to the decolorized tallow as described in the examples, but shall include other fats and oils to be used for industrial purposes where either the odor value is not important, or the odorous mercaptans are removed in the further processing of the fat or oil for its end use. Such products for which this invention is useful will include non-edible forms of sardine, soybean and olive oils, oils such as cottonseed, linseed and menhaden oil which are not used as foods, or any fraction of fat or oil derived from animal, marine or vegetable sources.

Moreover, although the invention is particularly useful for the prevention of color reversion in tallow stock for soap-making, it is also useful in the prevention of color reversion in oils for other purposes such as paint oils, plasticizers, cosmetic oils and other industrial products where light-colored oils or fats are required.

We claim:

1. In the manufacture of soap from decolorized fatty materials, a method of preventing color reversion of said fatty material prior to its conversion into soap, which includes the steps of: adding to said fatty material between 0.005% and .3% of at least one member of a group of mercaptans consisting of 2-mercaptoethanol, thiophenol, thiocresol, benzyl mercaptan, or their homologs and between .005% and .3% of orthophosphoric acid; and washing out residual mercaptans and acid with alkali solution in the soap making process.

2. A method for preventing color reversion in fatty materials which have been decolorized by extraction with a low-boiling solvent at temperatures in the range of temperatures near the critical temperature of the solvent in which miscibility of oil and solvent decreases as temperature increases, which method involves adding to said decolorized extracted fatty material between 0.005% and 0.3% of at least one member of a group consisting of 2-mercaptoethanol, thiocresol, thiophenol, benzyl mercaptan or their homologs, and between .005% and .3% of orthophosphoric acid.

3. A method for preventing color reversion in fatty acids which involves adding between 0.005% and 0.3% of at least one member of a group consisting of 2-mercaptoethanol, thiocresol, thiophenol, benzyl mercaptan or their homologs, and between 0.005% and 0.3% of orthophosphoric acid.

4. A method of preventing color reversion in a tallow material by adding between 0.05% and 0.3% of 2-mercaptoethanol and 0.01% and 0.1% of orthophosphoric acid.

5. A method for the prevention of color reversion in menhaden oil which involves adding between 0.05% and 0.5% of at least one member of a group of mercaptans consisting of 2-mercaptoethanol, thiophenol, thiocresol, benzyl mercaptan and their homologs and between 0.01% and 0.1% of oxalic acid.

6. A method for retarding the color reversion of fatty materials which have been decolorized by treatment with a liquefied, normally gaseous hydrocarbon which comprises incorporating in said decolorized fatty materials a small amount of a compound containing as the only sulfur group a sulfhydryl group activated by an aromatic ring.

7. A method for retarding the color reversion of fatty materials which comprises: subjecting said fatty materials to a decolorization treatment with a liquefied, normally gaseous hydrocarbon; and thereafter incorporating in said decolorized fatty materials a small amount of a compound containing as the only sulfur group of sulfhydryl group activated by an aromatic ring.

8. A method as in claim 7 wherein the compound containing the activated sulfhydryl group is present in an amount ranging from about 0.3 percent to about 1.0 percent by weight of the fatty material.

9. A method as in claim 7 wherein the compound containing the activated sulfhydryl group is present in an amount ranging from about 0.01 percent to about 5 percent by weight of the fatty material.

References Cited in the file of this patent

UNITED STATES PATENTS

| 2,154,341 | Martin | Apr. 11, 1939 |
| 2,202,103 | Hitchcock | May 28, 1940 |
| 2,456,937 | Gyorgy | Dec. 21, 1948 |
| 2,564,106 | Gribbins | Aug. 14, 1951 |
| 2,657,982 | Hill | Nov. 3, 1953 |
| 2,680,121 | Hlavacek | June 1, 1954 |